(12) United States Patent
Kim et al.

(10) Patent No.: US 7,548,759 B2
(45) Date of Patent: Jun. 16, 2009

(54) POWER CONTROLLING METHOD DURING A SOFT HANDOFF IN A MOBILE COMMUNICATION SYSTEM

(75) Inventors: Youn-Sun Kim, Seoul (KR); Jae-Sung Jang, Kwachon-shi (KR); Ho-Kyu Choi, Songnam-shi (KR); Hwan-Joon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 575 days.

(21) Appl. No.: 10/227,989

(22) Filed: Aug. 26, 2002

(65) Prior Publication Data

US 2003/0045321 A1    Mar. 6, 2003

(30) Foreign Application Priority Data

Aug. 30, 2001    (KR)    ................. 2001-53021

(51) Int. Cl.
  *H04Q 7/20*    (2006.01)
  *H04B 7/00*    (2006.01)
  *H04B 1/04*    (2006.01)

(52) U.S. Cl. .................. 455/522; 436/69; 436/127.1

(58) Field of Classification Search ................. 455/436, 455/442, 439, 440, 67.11, 522, 69, 453, 438, 455/423, 450, 127.1, 226.1, 522.1; 370/330, 370/332
See application file for complete search history.

(56) References Cited

U.S. PATENT DOCUMENTS

| | | | | |
|---|---|---|---|---|
| 5,159,593 A | * | 10/1992 | D'Amico et al. | 370/332 |
| 5,390,366 A | * | 2/1995 | Kasugai | 455/524 |
| 5,479,410 A | * | 12/1995 | Paavonen | 370/332 |
| 5,577,047 A | | 11/1996 | Persson et al. | |
| 5,648,955 A | | 7/1997 | Jensen et al. | |
| 5,711,003 A | * | 1/1998 | Dupuy | 455/436 |
| 5,898,730 A | | 4/1999 | Hensley et al. | |
| 5,918,176 A | | 6/1999 | Arrington, Jr. et al. | |
| 5,946,621 A | * | 8/1999 | Chheda et al. | 455/440 |
| 5,991,627 A | * | 11/1999 | Honkasalo et al. | 455/437 |
| 6,154,653 A | * | 11/2000 | Jung | 455/442 |
| 6,216,004 B1 | * | 4/2001 | Tiedemann et al. | 455/442 |
| 6,570,861 B1 | * | 5/2003 | Marsan et al. | 370/330 |

(Continued)

FOREIGN PATENT DOCUMENTS

EP    0 448 015 A2    3/1991

(Continued)

OTHER PUBLICATIONS

European Search Report dated Mar. 13, 2003, issued in a counterpart application, namely, Appln. No. 02019484.1.

(Continued)

*Primary Examiner*—Tilahun B Gesesse
(74) *Attorney, Agent, or Firm*—The Farrell Law Firm, LLP

(57) ABSTRACT

A power control method during a soft handoff in a mobile communication system. A mobile station communicating with a plurality of base stations at a soft handoff measures the signal strengths of forward common pilot channels received from the base stations and transmit them to the base stations sequentially. Then the base stations control the transmission power of forward common power control channels according to the received signal strength measurements.

15 Claims, 7 Drawing Sheets

U.S. PATENT DOCUMENTS

| | | | |
|---|---|---|---|
| 6,747,965 B1 * | 6/2004 | Nara et al. | 455/442 |
| 6,799,044 B1 * | 9/2004 | Wesby et al. | 455/452.1 |
| 6,859,444 B1 * | 2/2005 | Vancraeynest | 370/331 |
| 6,928,285 B2 * | 8/2005 | Hunzinger | 455/438 |
| 6,996,391 B2 * | 2/2006 | Hunzinger | 455/404.1 |
| 7,006,821 B2 * | 2/2006 | Tee | 455/421 |
| 7,006,828 B1 * | 2/2006 | Czaja et al. | 455/442 |
| 7,010,319 B2 * | 3/2006 | Hunzinger | 455/522 |
| 7,082,303 B2 * | 7/2006 | Sayeedi et al. | 455/439 |
| 7,187,930 B2 * | 3/2007 | Hunzinger | 455/437 |
| 2004/0176094 A1 * | 9/2004 | Kim et al. | 455/438 |

FOREIGN PATENT DOCUMENTS

| | | | |
|---|---|---|---|
| EP | 680160 | * | 4/1995 |
| JP | 09-261170 | | 10/1997 |
| JP | 2000-102055 | | 4/2000 |
| JP | 2001-128219 | | 5/2001 |
| WO | WO 98/56200 | | 12/1998 |
| WO | WO 99/43100 | | 8/1999 |
| WO | WO 99/53630 | | 10/1999 |
| WO | WO 01/08322 | | 2/2001 |
| WO | WO 01/26411 | | 4/2001 |
| WO | WO 02/19563 | | 3/2002 |

OTHER PUBLICATIONS

UK Combined Search and Examination Report dated Mar. 3, 2003, issued in a counterpart application, namely, Appln. No. GB 0219864.6.

* cited by examiner

POWER CONTROLLING METHOD DURING A SOFT HANDOFF IN A MOBILE COMMUNICATION SYSTEM

PRIORITY

This application claims priority to an application entitled "Power Controlling Method during Soft Handoff in a Mobile Communication System" filed in the Korean Industrial Property Office on Aug. 30, 2001 and assigned Serial No. 2001-53021, the contents of which are hereby incorporated by reference.

BACKGROUND OF THE INVENTION

1. Field of the Invention

The present invention relates generally to a mobile communication system supporting a multimedia service including voice and data services, and in particular, to a power controlling method for a terminal located in a soft handoff region.

2. Description of the Related Art

A typical mobile communication system, for example, a CDMA (Code Division Multiple Access) mobile communication system such as IS-2000 supports only voice service. Recently, however, communication technology has been developed to support data. HDR (High Data Rate) is a mobile communication system proposed to support only a high rate data service.

Although there is a need for supporting concurrent provision of voice and data services, existing mobile communication system support them separately. To satisfy this demand, a standardization called 1×EV-DV (Evolution-Data and Voice) system has been proposed recently.

In mobile communication, a whole service area is segmented into cells, and the cells are managed by base stations (BSs). By controlling the BSs under an MSC (Mobile Switching Center), mobile stations (MSs) are allowed to continue calls, moving from one cell to another cell. A BS communicates with an MS on a radio channel. As such, when compared to land communication systems that communicate by cable, mobile communication systems may experience transmission errors due to fading and interference. The most popular method of preventing the transmission errors is to use power sufficiently high to cover fading and interference. However, excess power may interfere with radio channels of adjacent users. Therefore, power control of a radio channel significantly influences system performance. Generally, a BS and an MS perform mutual power control. A procedure of controlling the power of a forward channel is called a forward power control and a procedure of controlling the power of a reverse channel is called a reverse power control.

A CDMA mobile communication system connects a plurality of code channels simultaneously on a single frequency channel at the same time point. Relying on this characteristic, an MS in an overlap region between BSs can communicate with the BSs concurrently on radio channels for a call. This is a soft handoff. At a soft handoff, power control must be performed for all the BSs communicating with the MS.

FIG. 1 illustrates channels associated with forward and reverse power control when an MS implements a soft handoff in a conventional mobile communication system. Here, the MS communicates with two BSs during the soft handoff.

Referring to FIG. 1, for a reverse power control, each of the BSs (sectors in the case of a sectored BS) compares the signal to noise ratio (SNR, that is, a pilot channel power to noise power ratio, Ep/Nt) of an R-PICH (Reverse Pilot Channel) from the MS with an outer loop set point preset for an outer loop power control. If the SNR is higher than the outer loop set point, the sector commands the MS to decrease reverse transmission power via an F-CPCCH (Forward Common Power Control Channel). If the SNR is less than or equal to the outer loop set point, the sector commands the MS to increase the reverse transmission power via the F-CPCCH.

At the soft handoff, F-CPCCHs (CPCCH1 and CPCCH2) are connected between the MS and at least two sectors (sector 1 and sector 2). If at least one of the F-CPCCHs commands a power decrease, the MS decreases its transmission power. The transmission power is increased only when the F-CPCCHs all command a power increase.

For a forward power control, the transmission power of the F-CPCCHs is determined by channel quality information received on an R-CQICH (Reverse Channel Quality Indicator Channel). The MS reports the reception strength of an F-PICH (Forward Pilot Channel) from a particular sector, that is, the carrier to interference ratio (C/I) of the F-PICH to the sector via the R-CQICH.

At the soft handoff illustrated in FIG. 1, the MS measures the C/I of an F-PICH from each of sector 1 and sector 2 and transmits the higher C/I on the R-CQICH to the sector having the higher C/I, that is, sector 1 in FIG. 1. Sector 1 determines the transmission power of CPCCH 1 using its C/I.

There are two problems that arise from the above described forward and reverse power control at the soft handoff.

(1) The first problem relates to a forward power control of at least two CPCCHs. An MS connects the F-CPCCHs to at least two sectors at a soft handoff, but the MS reports the C/I of a PICH from only one of the sectors. For example, if the MS is in communication with sector 1 and sector 2 at the soft handoff and sector 1 has better forward channel quality than sector 2 in FIG. 1, the MS transmits only the C/I of PICH 1 from sector 1 to sector 1. Sector 1 then determines the transmission power of CPCCH 1 using the C/I. On the other hand, sector 2 cannot determine the transmission power of CPCCH 2 because it does not receive the C/I of PICH 2.

(2) The second problems relates to determination of the transmission power of the R-CQICH. The transmission power of the R-CQICH stays constant at a predetermined ratio to that of an R-PICH and a reverse traffic channel. This implies that as the transmission power of the R-PICH and the reverse traffic channels decreases/increases, the transmission power of the R-CQICH must decrease/increase at the same rate.

However, the R-CQICH is not soft-handed off like the R-PICH. Specifically, the R-CQICH is transmitted to only one sector having the best forward channel quality. Conversely, the R-PICH and the reverse traffic channel are transmitted to at least two sectors at a soft handoff. Thus, their reception performance is ensured. The reception performance of the R-PICH can be improved by selection diversity or combining.

If the same power control as for the R-PICH and the reverse traffic channel is applied to the R-CQICH at the soft handoff, a desired reception performance can be achieved from the R-PICH and the reverse traffic channel, but the reception performance of the R-CQICH may be lower than intended.

SUMMARY OF THE INVENTION

It is, therefore, an object of the present invention to provide a method of controlling the transmission power of an F-CPCCH that transmits a reverse power control command during a soft handoff in a mobile communication system.

It is another object of the present invention to provide a method of controlling the transmission power of a forward channel using forward channel quality information received from an MS during a soft handoff in a mobile communication system.

It is a further object of the present invention to provide a method of transmitting forward link quality from an MS during a soft handoff in a mobile communication system.

It is still another object of the -present invention to provide a method of transmitting the reception strengths of forward channels from a plurality of BSs in communication with an MS to the BSs at a soft handoff in a mobile communication system.

It is yet another object of the present invention to provide a method determining the order of transmitting forward channel quality information to a plurality of BSs in communication with an MS at a soft handoff in the MS of a mobile communication system.

It is also yet another object of the present invention to provide a method of controlling the transmission power of an R-PICH and an R-CQICH individually in a mobile communication system.

To achieve the above and other objects, a mobile station communicating with a plurality of base stations at a soft handoff measures the signal strengths of forward common pilot channels received from the base stations and transmit them to the base stations sequentially. Then the base stations control the transmission power of forward common power control channels according to the received signal strength measurements.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

A brief description of channels used for a mobile communication system according to the present invention is given below.

A CPCCH (Common Power Control Channel) is transmitted forward and a CQICH (Channel Quality Indicator Channel) is transmitted reverse. The CPCCH is a code channel used to control the reverse transmission power of a plurality of MSs. The CQICH transmits the channel quality, that is, signal strength such as C/I of a forward common pilot channel from a neighbor BS (sector in the case of a sectored BS, hereinafter called sector) to the sector.

Additional information delivered on the CQICH is a sector indicator indicating a sector having the best channel quality, that is, a sector from which the MS is to receive packet data on a forward traffic channel. Upon receipt of its forward channel quality information and sector indicator on the R-CQICH, the sector determines a transmission time of forward packet data, a modulation scheme, a code rate, etc using the received information. The sector also controls the transmission power of a CPCCH directed to the MS using the information received on the R-CQICH.

Figure 1:
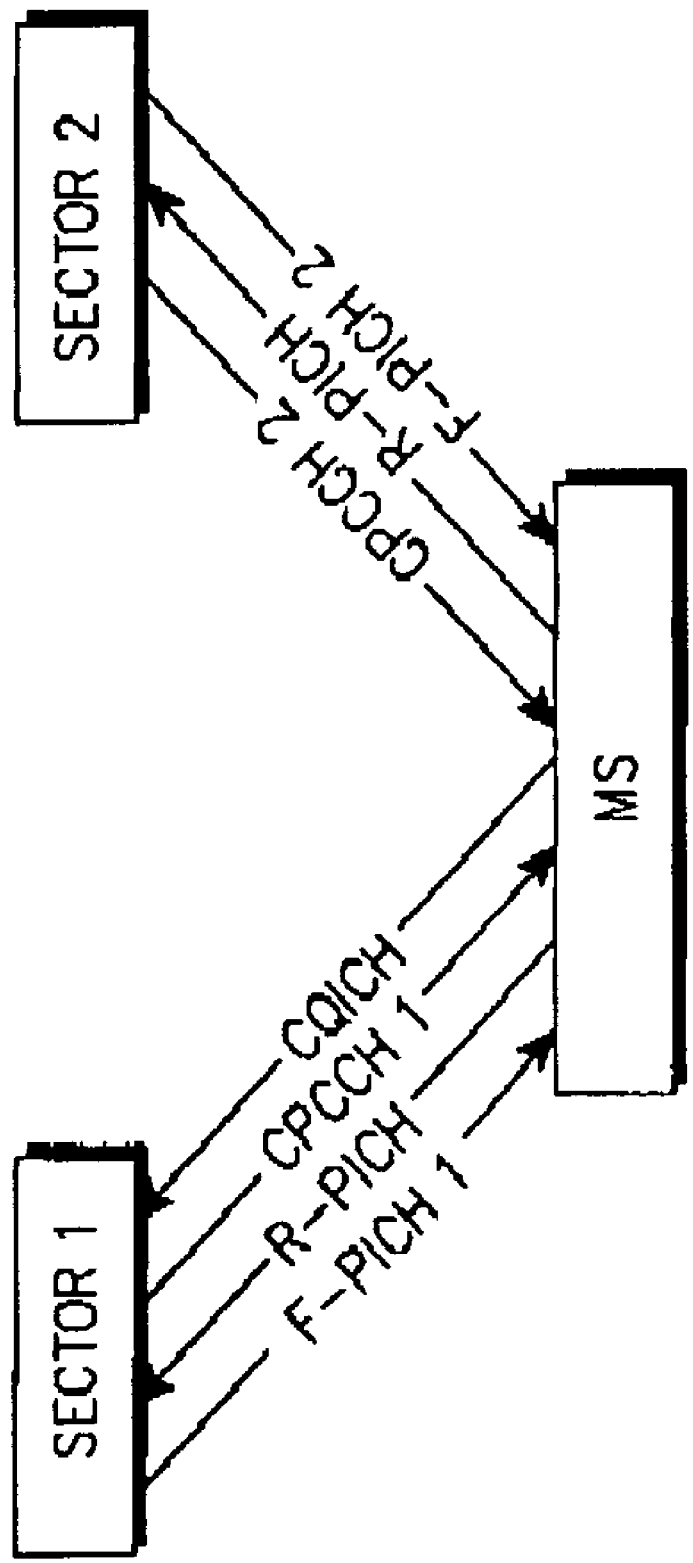
FIG. 1 illustrates channels associated with forward and reverse power control in a conventional mobile communication system.
Figure 2:
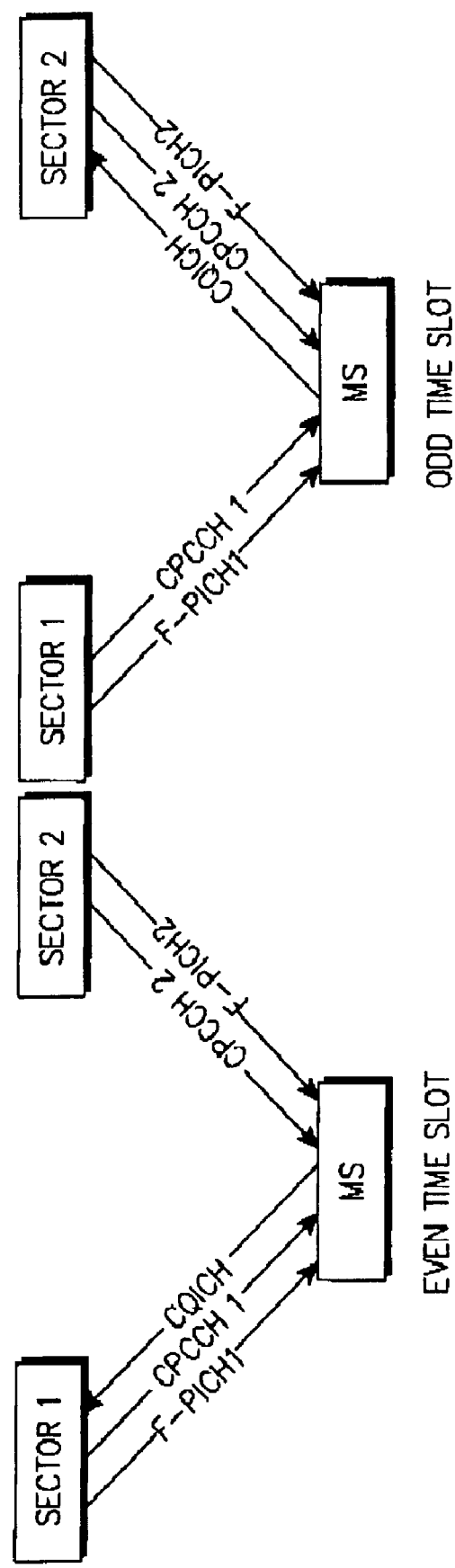
FIG. 2 illustrates channels associated with forward and reverse power control in a mobile communication system according to the present invention.

FIG. 2 illustrates channels associated with forward and reverse power control during a soft handoff in a mobile communication system according to the present invention. Particularly forward power control for at least two sectors during a soft handoff is illustrated in FIG. 2.

Referring to FIG. 2, the R-CQICH sequentially transmits the signal strength measurements of all sectors in communication with an MS at a soft handoff. When the MS communicates with sector 1 and sector 2 at a soft handoff, it alternately transmits the signal strength measurements of F-PICH1 and F-PICH2 from sector 1 and sector 2 to the sectors. The MS transmits the signal strength measurement of F-PICH1 to sector 1 on the CQICH in even-numbered time slots and the signal strength measurement of F-PICH2 to sector 2 on the CQICH in odd-numbered time slots. Here, the transmission power of the CQICH is controlled to allow the sectors to receive it with a certain reception performance. The alternate transmission of the CQICH to sector 1 and sector 2 enables control of the transmission power of CPCCH 1 and CPCCH 2 of the sectors in the MS.

Figure 3:
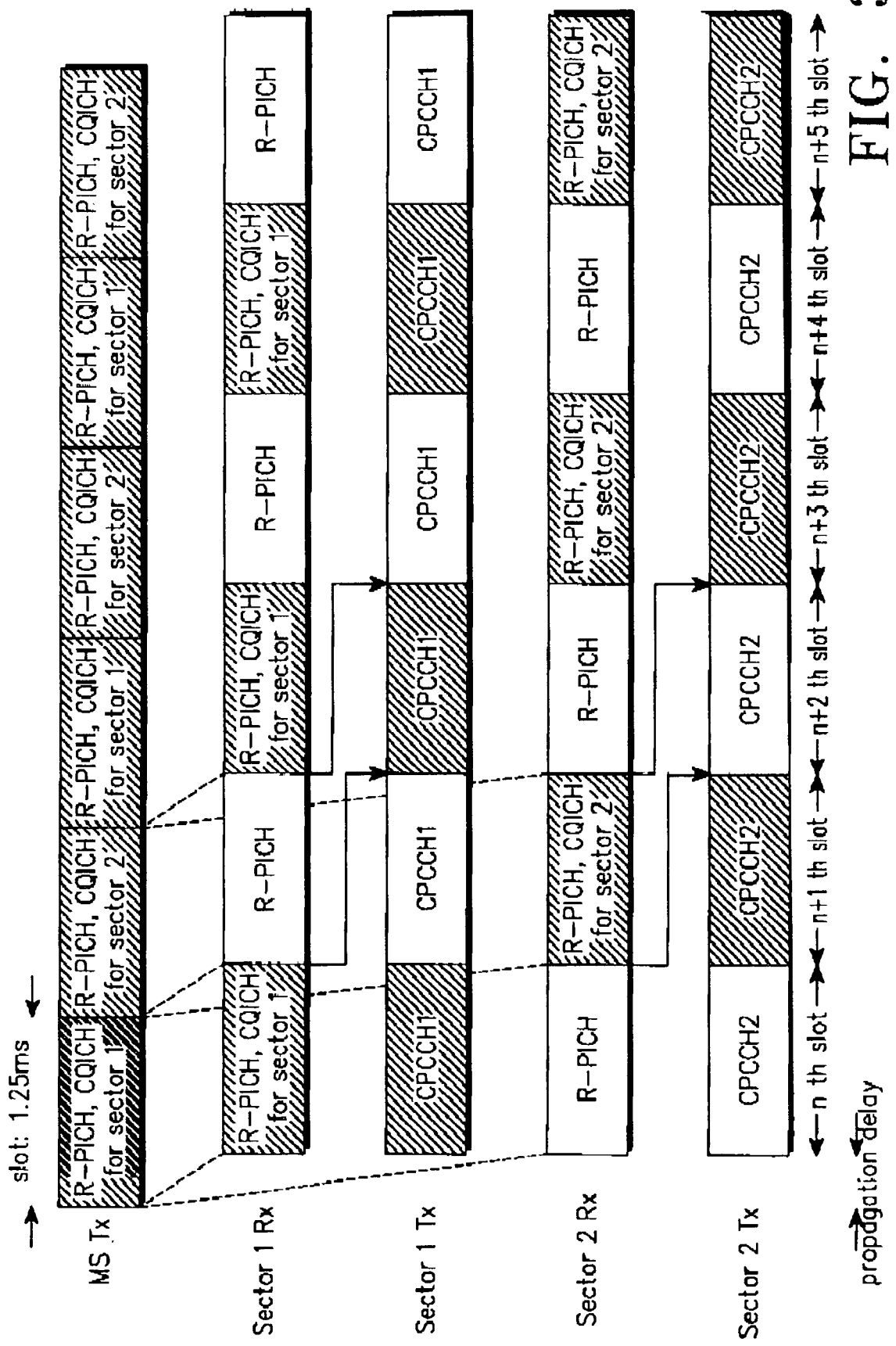
FIG. 3 is a diagram illustrating a timing relationship between the channels illustrated in FIG. 2.

FIG. 3 illustrates the timing of transmission and reception of the channels associated with forward and reverse power control during a soft handoff in the mobile communication system according to the present invention. Referring to FIG. 3, the MS transmits the R-PICH and the CQICH in all time slots. In the presence of data to be transmitted, a traffic channel is transmitted to a particular sector along with the R-PICH and the CQICH.

The MS communicates with sector 1 and sector 2 due to the soft handoff. The MS transmits forward channel quality information alternately to sector 1 and sector 2 in alternate 1.25-ms time slots. The CQICH transmits forward channel quality information measured on an F-PICH from sector 1 to sector 1 in nth, (n+2)th, and (n+4)th time slots, and forward channel quality information measured on an F-PICH from sector 2 to sector 2 in (n+1)th, (n+3)th, and (n+5)th time slots. A power control is performed in time slots marked with slash lines. Power control performed in previous time slots is maintained in time slots not marked.

In operation, the MS transmits the signal strength measurement of the F-PICH from sector 1 back sector 1 in even-numbered time slots of each frame. Sector 1 then determines the transmission power of CPCCH 1 based on the received information. The MS transmits the signal strength measurement of the F-PICH from sector 2 back sector 2 in odd-numbered time slots of each frame. Sector 2 then determines the transmission power of CPCCH 2 based on the received information. Sector 1 and sector 2 maintain the transmission power of their CPCCHs applied to previous time slots in time slots where the forward channel quality information is not received.

The CQICH transmits a sector indicator indicating a sector having the best forward channel quality (hereinafter, referred to as the best sector) along with the forward channel quality information. The sector indicator functions to notify the other sectors of the best sector for the purpose of providing information required for forward power control. The active set sectors compare their sector indicators with the sector indicator received on the CQICH in their assigned time slots. If they are different, the sectors exclude the MS from transmission scheduling.

Each time its active set is updated, the MS transmits forward channel quality information to at least one active set sector. Supposing that an old sector first connected to the MS via forward and reverse channels is defined as a service sector, the active set is updated by a command from the service sector. That is, the service sector has the same active set as the MS. When necessary, it first updates the active set and then commands the MS to update the active set.

Time slots in which forward channel quality information is transmitted are assigned according to a rule preset between the MS and the service sector (first embodiment), or by the service sector (second embodiment). In the first embodiment, the MS assigns time slots to active set sectors according to the rule and transmits corresponding forward channel quality information on the time slots. The service sector also assigns time slots to the active set sectors including the service sector according to the rule and then notifies the other active set sectors of the slot assignment. In the second embodiment, the service sector assigns time slots to the active set sectors and then notifies the active set sectors and the MS of the slot assignment.

Herein below, a description will be made of the operation of the MS and the service sector.

Figure 4:
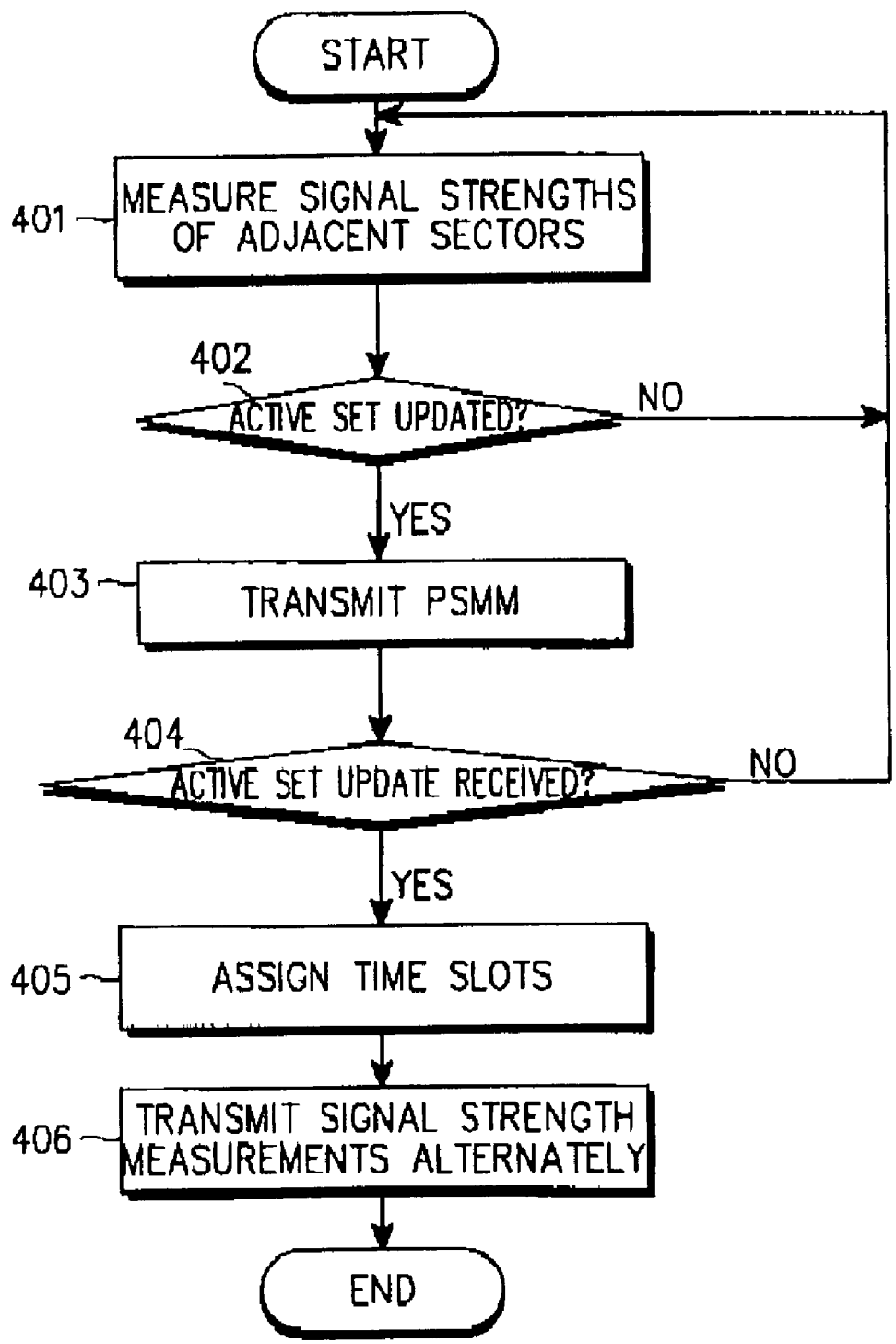
FIG. 4 is a flowchart illustrating an MS operation for alternately transmitting an R-CQICH to at least two sectors at a soft handoff in a mobile communication system according to an embodiment of the present invention.

FIG. 4 is a flowchart illustrating a procedure for transmitting signal strength measurements as forward channel quality information alternately to at least two sectors in an MS at a soft handoff in the mobile communication system according to an embodiment of the present invention. Referring to FIG. 4, the MS measures the signal strength (e.g., C/I) of an F-PICH from each of adjacent sectors at every predetermined period in step 401 and compares the signal strengths with a threshold T_ADD set for updating an active set in step 402. That is, if at least one of the signal strengths is greater than the threshold T_ADD, the MS requests the service sector to update the active set by a PSMM (Pilot Strength Measurement Message) in step 403. Then the service sector notifies the MS of the updated active set by a signaling message.

In step 404, the MS determines whether information about the updated active set has been received from the service sector. Upon receipt of the updated active set information, the MS proceeds to step 405 and otherwise, it returns to step 401.

In step 405, the MS assigns time slots on which to transmit signal strength measurements to active set sectors. As stated before, the MS can assign time slots according to a predetermined rule according to the first embodiment, or according to time slot assignment information received from the service sector by a signaling message preset between the service sector and the MS according to the second embodiment. The time slot assignment will be described later in more detail.

Finally, the MS sequentially transmits the signal strength measurements to the active set sectors from the time when the active set is updated in step 406. Along with the signal strength measurements, a sector indicator indicating the best sector is transmitted to the active set sectors.

Meanwhile, the time slots can be assigned according to the signal strength measurements of F-PICHs from the active set sectors. For example, if the active set includes sector 1 and sector 2 and the PICH signal strength of sector 1 is greater than that of sector 2, the MS transmits sector 1 its signal strength measurement in every even-numbered time slot for a time period when the active set is effective. Similarly, the MS transmits sector 2 its signal strength measurement in every odd-numbered time slot for the active set effective time period.

Figure 5:
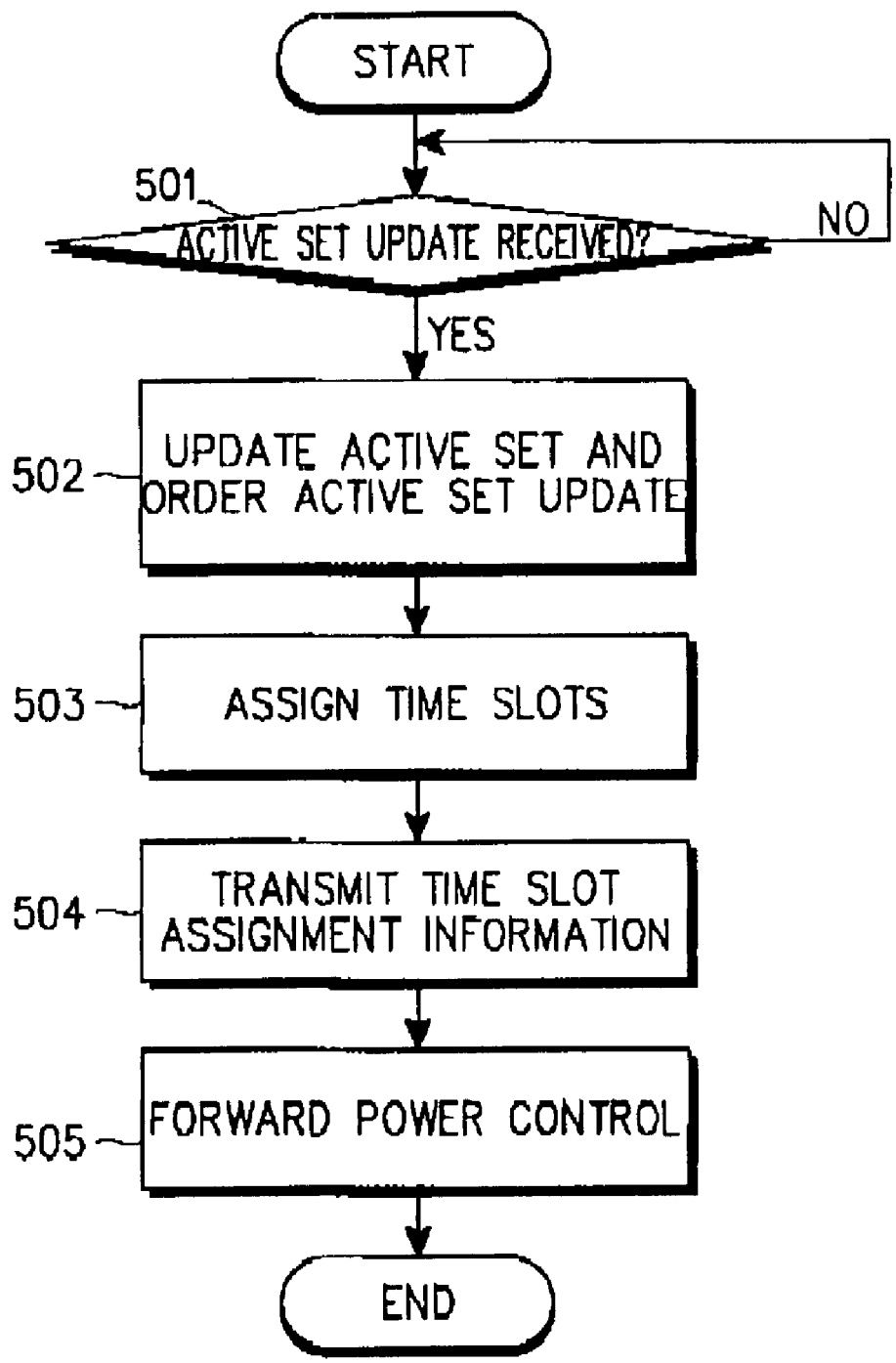
FIG. 5 is a flowchart illustrating an operation in a service sector for transmitting the R-CQICH alternately to at least two sectors at a soft handoff in a mobile communication system according to another embodiment of the present invention.

FIG. 5 is a flowchart illustrating an operation in a service sector for alternately transmitting forward channel quality information to at least two sectors from an MS at a soft handoff in the mobile communication system according to another embodiment of the present invention.

Referring to FIG. 5, the service sector determines whether a PSMM requesting updating of an active sect has been received from the MS in step 501. Upon receipt of the PSMM, the service sector updates the active set of the MS using the signal strength measurements, for example, C/Is of PICHs from adjacent sectors as set in the PSMM in step 502. That is, the service sector determines which sector to add to the active set and which sector to exclude from the active set. More specifically, a sector having a signal strength greater than the threshold T_ADD is added to the active set and a sector having a signal strength less than a predetermined threshold T_DROP for a predetermined threshold time is dropped from the active set. The service sector transmits information about the updated active set to the MS to order the MS to update its active set.

In step 503, the service sector assigns time slots to all active set sectors for the MS to transmit corresponding signal strength measurements to them. For example, the time slots can be assigned according to the signal strength measurements. The service sector then notifies the other active set sectors of the assignment information in step 504. In the first embodiment of time slot assignment, since the MS itself assigns time slots, the service sector need not notify the MS of the assignment information. In the second embodiment of time slot assignment, the service sector notifies the MS as well as the other active set sectors of the assignment information. Here, a signaling message preset between the service sector and the MS is used to transmit the assignment information to the MS.

In step 505, the service sector receives its signal strength measurement in an assigned time slot from the MS and controls the transmission power of a CPCCH. In the same manner, the other active set sectors receive their signal strength measurements from the MS on the CQICH and control the transmission power of CPCCHs. Here, the active set sectors analyze their received signal strength measurements and perform forward power control. If a sector indicator set in the CQICH is identical to the sector indicator of a particular sector, the sector concurrently performs a forward power control and packet data scheduling for the MS. Step 505 is performed from the active set updated time.

Figure 6:
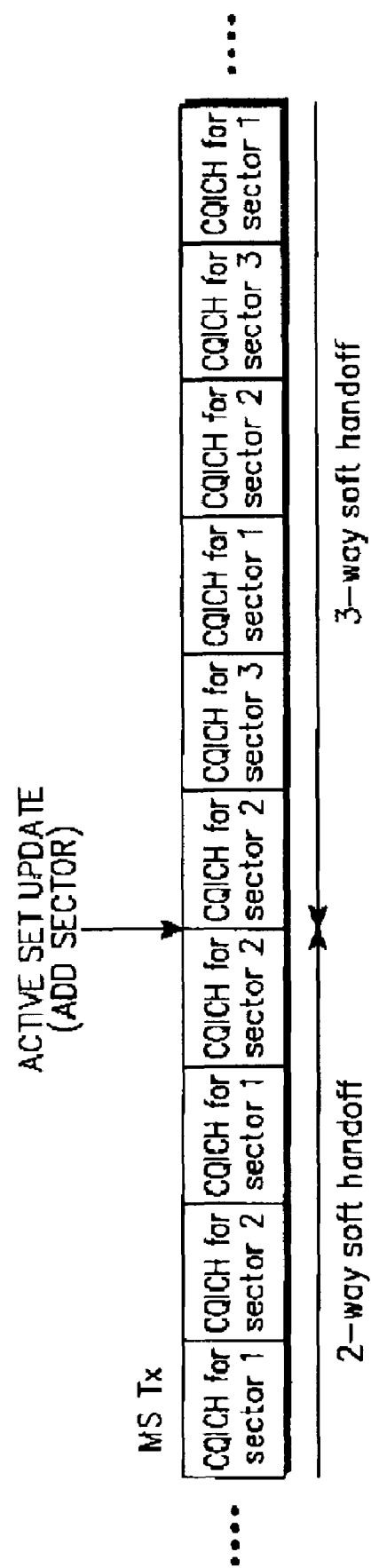
FIG. 6 is a diagram temporally illustrating transmission of the R-CQICH with respect to an active set update time according to the present invention.

FIG. 6 illustrates transmission of channel quality information from the MS with respect to an active set updated time according to the present invention. Referring to FIG. 6, the MS updates the active set at a time indicated by an arrow. The active set is updated to include a sector 3 in addition to sector 1 and sector 2 at the active set updated time. This means that the MS transitions from a 2-way soft handoff state to a 3-way soft handoff state. It is assumed that the signal strength of sector 1 is higher than that of sector 2 before the active set updating and that sector 2, sector 3, and sector 1, in this order, have higher signal strengths after the active set updating.

Before the active set updating, the MS transmits corresponding pilot signal strength measurements alternately to sector 1 and sector 2 in even-numbered time slots and odd-numbered time slots, respectively. After the active set updating, the MS transmits corresponding pilot signal strength measurements to sector 2, sector 3, and sector 1 sequentially.

A rule of assigning time slots to active set sectors for transmission of forward channel quality information as applied to FIGS. 4, 5, and 6 is summarized as follows.

If N sectors are included in the active set and the number of time slots proceeding after the active set updated time is i, the MS transmits forward channel quality information in the following order.

When i% N=0, the MS transmits corresponding forward channel quality information to a sector having the highest pilot signal strength.

When i% N=1, the MS transmits corresponding forward channel quality information to a sector having the second highest pilot signal strength.

When i% N=N−2, the MS transmits corresponding forward channel quality information to a sector having the second lowest pilot signal strength.

When i% N=N−1, the MS transmits corresponding forward channel quality information to a sector having the lowest pilot signal strength.

That is, the MS determines time slots in which channel quality information is transmitted to a particular sector by the remainder of dividing i by N.

Figure 7:
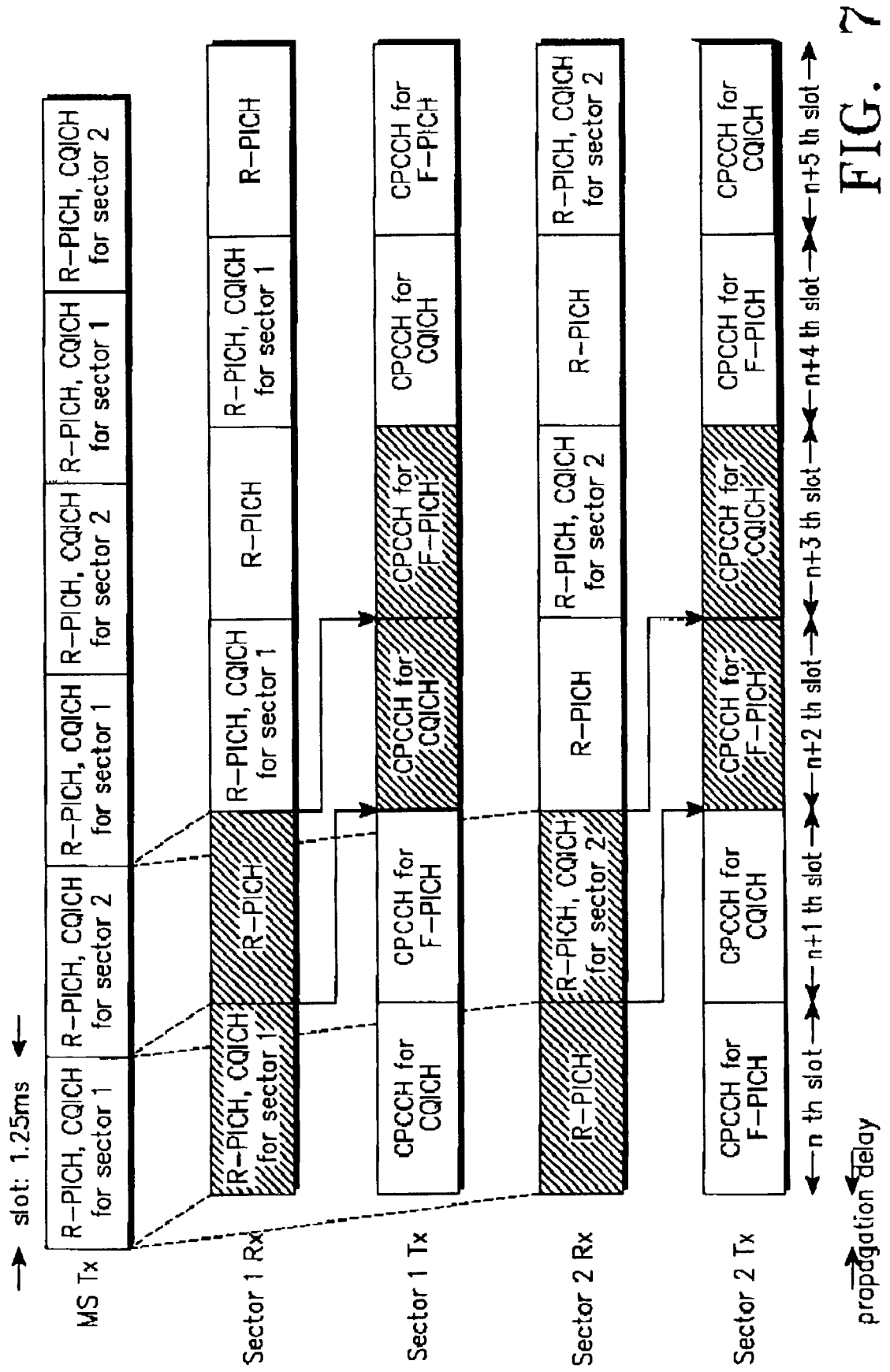
FIG. 7 illustrates transmission and reception of the channels associated with forward and reverse power control in the mobile communication system according to the present invention.

FIG. 7 illustrates the timing of transmission and reception of the channels associated with forward and reverse power control when a reverse power control, specifically a CQICH, is performed using F-CPCCHs at a soft handoff.

As illustrated in FIG. 7, in order to control the transmission power of the CQICH, sector 1 and sector 2 in communication with the MS at a soft handoff transmit a power control command for the R-PICH in a half of an F-CPCCH and a power control command for the CQICH in the other half of the F-CPCCH. The MS separates the power control commands for the R-PICH and the CQICH from the F-CPCCH and performs a power control for each of the R-PICH and the CQICH. Thus, reverse channels not to be handed off, such as the CQICH, and reverse channels to be handed off, such as the R-PICH and reverse traffic channels, have optimum reception performance.

The MS discriminates a power control command for the F-PICH from a power control command for the CQICH in the same manner as time slot assignment.

The sectors participating in a soft handoff start to transmit power control commands for the CQICH in the third time slot from a reception time of channel quality information. They transmit power control commands for the R-PICH in the other time slots. Two time slots after the reception time of the channel quality information are used to analyze the channel quality information and generate a power control command for the CQICH. The number of time slots for this purpose is dependent on system performance.

For example, when the MS communicates with two sectors, sector 1 and sector 2, at a soft handoff, sector 1 receives its CQICH in the nth, (n+2)th, (n+4)th, . . . slots of the CQICH. Sector 1 measures the reception strength of the CQICH in the nth slot, compares the signal strength with an outer loop set point for the CQICH, and determines a power control command for the (n+2)th slot. Similarly, sector 1 compares the signal strengths of the CQICH measured in the (n+2)th, (n+4)th, . . . slots with the outer loop set point and determines power control commands for the (n+4)th, (n+6)th, . . . slots, respectively. Sector 1 measures the reception strengths of the R-PICH in the (n+1)th, (n+3)th, and (n+5)th slots, compares the signal strengths with an outer loop set point for the R-PICH, and determines power control commands for the (n+3)th, (n+5)th, and (n+7)th slots.

On the other hand, sector 2 measures the reception strength of the CQICH in the (n+1)th slot, compares the signal strength with an outer loop set point for the CQICH, and determines a power control command for the (n+3)th slot. Similarly, sector 2 compares the signal strengths of the CQICH measured in the (n+3)th, (n+5)th, . . . slots with the outer loop set point and determines power control commands for the (n+5)th, (n+7)th , . . . slots, respectively. Sector 2 measures the reception strengths of the R-PICH in the nth, (n+2)th, and (n+4)th slots, compares the signal strengths with an outer loop set point for the R-PICH, and determines power control commands for the (n+2)th, (n+4)th, and (n+6)th slots.

The outer loop set points for the CQICH and the R-PICH in sector 1 and sector 2 can be set to the same value or different values.

As described above, the present invention provides a method of efficiently controlling the transmission power of the CQICH and the F-CPCCH. When N sectors are participating in a soft handoff, the MS transmits corresponding forward channel quality information to the N sectors sequentially. Therefore, the transmission power of F-CPCCHs from at least two sectors can be controlled effectively.

Since the MS transmits forward channel quality information every 1.25 ms, when it transmits to N sectors sequentially, each sector receives corresponding forward channel quality information in every 800/N [Hz] period. The service sector transmits a power control command for the CQICH two slots after receiving corresponding forward channel quality information from the MS and transmits a power control command for the R-PICH in the other slots. As a result, the control command for the CQICH is also transmitted on an F-CPCCH in every 800/N [Hz] period. Since the control command for the R-PICH is transmitted in the remaining slots of the F-CPCCH, its transmission period is (800-800/N) [Hz].

The present invention pertains to an effective power control of channels related with a soft handoff, that is, when an active set includes at least two sectors. If the MS is outside a soft handoff region, it transmits the CQICH to one sector. Then, the F-CPCCH controls the transmission power of the R-PICH only. That is, the CQICH and the R-PICH are power-controlled in the conventional method when a soft handoff is not implemented.

In accordance with the present invention as described above, when an MS communicates with at least two sectors at a soft handoff, it transmits corresponding pilot signal strength measurements alternately to the sectors, so that the transmission power of CPCCHs from the sectors can be controlled. During the soft handoff, a service sector transmits power control commands for a CQICH and an R-PICH to the MS. Therefore, the transmission power of the CQICH and the transmission power of the R-PICH are controlled separately.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting signal strength measurements of forward channels received from a plurality of base stations communicating with a mobile station at a soft handoff to the base stations from the mobile station in a mobile communication system, comprising the steps of:

assigning a time slot to each base station; and transmitting the signal strength measurements corresponding to each base station during its assigned time slot respectively, wherein an indicator indicating a base station having the highest signal strength among the base stations is transmitted in the transmitting step.

2. The method of claim 1, wherein the signal strength measurements are carrier to interference ratios of forward common pilot channels.

3. The method of claim 1, wherein the time slots are assigned when one of the base stations is dropped or a new base station is added to the base stations.

4. The method of claim 3, wherein the one of the base stations is dropped or the new base station is added when one of the signal strength measurements of the forward channels received from adjacent base stations including the base stations communicating with the mobile station at the soft handoff is less than a second threshold continuously for a predetermined time period, or greater than a first threshold.

5. The method of claim 1, wherein the time slots are assigned according to the signal strength measurements.

6. A method of transmitting signal strength measurements of forward channels received from a plurality of base stations communicating with a mobile station at a soft handoff to the base stations from the mobile station in a mobile communication system, comprising the steps of:

receiving information defining a time slot assigned to each base station from a service base station among the base stations; and transmitting the signal strength measurements corresponding to each base station during its assigned time slot respectively, wherein an indicator indicating a base station having the highest signal strength among the base stations is transmitted in the transmitting step.

7. The method of claim 6, wherein the signal strength measurements are carrier to interference ratios of forward common pilot channels.

8. A signal strength measurement transmitting method in a mobile station communicating with a plurality of base stations at a soft handoff in a mobile communication system, comprising the steps of:

measuring signal strengths of forward channels received from the base stations respectively; and transmitting the signal strength measurements corresponding to the base stations, sequentially, wherein an indicator indicating a base station having the highest signal strength among the base stations is transmitted in the transmitting step.

9. A signal strength measurement receiving method for a forward power control in a service base station among a plurality of base stations communicating with a mobile station at a soft handoff in a mobile communication system, comprising the steps of:

assigning a time slot to each base station;

transmitting information about the time slot assignment to the other base stations; and receiving a signal strength measurement of a first forward channel from the mobile station in the time slot assigned to the service base station, said signal strength measurement includes signal strength measurements of each base station measured by the mobile station during the time slot assigned to each base station, wherein an indicator indicating a base station having the highest signal strength is received in the receiving step.

10. The method of claim 9, wherein the signal strength measurement of the first forward channel is a carrier to interference ratio of a forward common pilot channel.

11. The method of claim 9, wherein the time slots are assigned when one of the base stations is dropped or a new base station is added to the base stations.

12. The method of claim 9, wherein the time slots are assigned according to signal strength measurements of forward channels from the base stations.

13. The method of claim 9, wherein the time slot assignment information is transmitted to the mobile station in the transmission step.

14. The method of claim 9, further comprising the step of controlling a transmission power of a second forward channel according to the received signal strength measurement of the first forward channel.

15. The method of claim 9, further comprising the steps of:

measuring a signal strength of a reverse channel received from the mobile station;

generating a power control command for the reverse channel according to the signal strength measurement of the reverse channel; and transmitting a power control command to the mobile station.

* * * * *